(12) United States Patent
Bhavnani

(10) Patent No.: US 7,270,579 B2
(45) Date of Patent: Sep. 18, 2007

(54) RECHARGING UNIT

(75) Inventor: Dilip Bhavnani, Beverly Hills, CA (US)

(73) Assignee: Sun Most, LLC, Commerce, CA (US)

( * ) Notice: Subject to any disclaimer, the term of this patent is extended or adjusted under 35 U.S.C. 154(b) by 0 days.

(21) Appl. No.: 11/422,873

(22) Filed: Jun. 7, 2006

(65) Prior Publication Data

US 2006/0223378 A1    Oct. 5, 2006

Related U.S. Application Data

(63) Continuation of application No. 11/008,051, filed on Dec. 8, 2004, now Pat. No. 7,086,907.

(51) Int. Cl.
*H01R 25/00* (2006.01)
(52) U.S. Cl. ...................... 439/638; 320/111
(58) Field of Classification Search ............... 439/638, 439/919; 320/2, 111
See application file for complete search history.

(56) References Cited

U.S. PATENT DOCUMENTS 5,075,615 A * 12/1991 Dantis .................. 320/111
6,809,943 B2 * 10/2004 Lanni .................. 363/144

* cited by examiner

*Primary Examiner*—Michael C. Zarroli
(74) *Attorney, Agent, or Firm*—The Soni Law Firm

(57) ABSTRACT

The invention is a recharging unit having an efficiently designed recharging base and at least one rechargeable implement, which also serve as an advertising means. The recharging base has two electrical prongs on the rear surface and at least one orifice on at least one outer surface of the base into which the rechargeable implement can be inserted for recharging. Each of the orifice lies completely within the surface where it is, and is configured to retain securely a rechargeable implement even in an inverted position. The recharging base is shaped and the electrical prongs are positioned and oriented such that when the recharging base is inserted into one socket of a common two socket electrical outlet, it does not block the second socket, thereby permitting both sockets to be accessible for concurrent use.

21 Claims, 5 Drawing Sheets

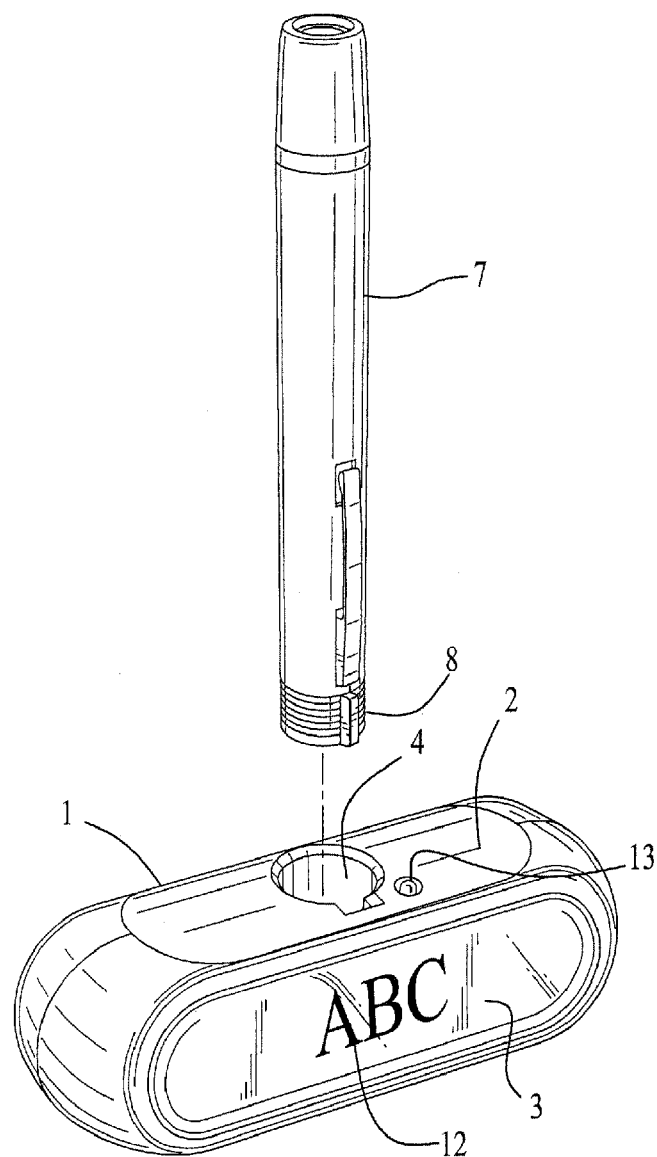
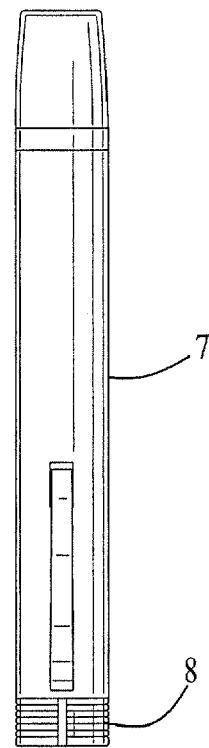
fig.1
fig.2

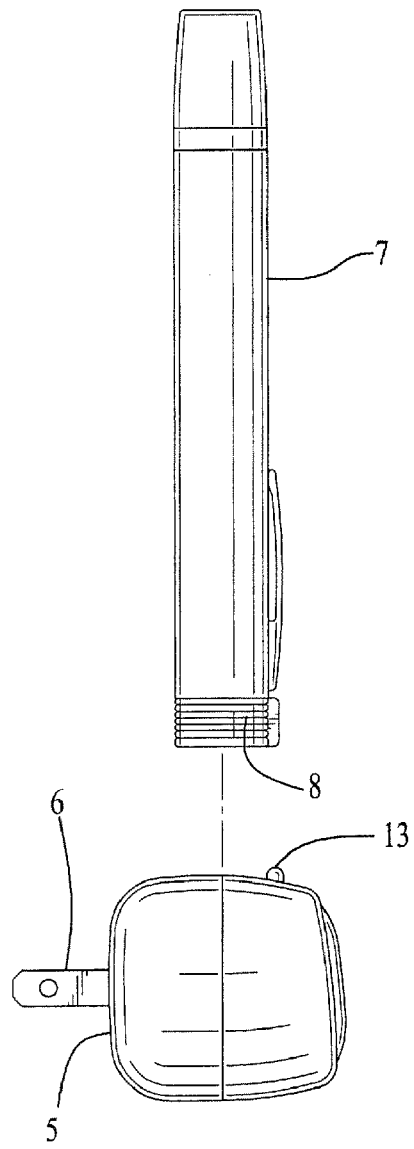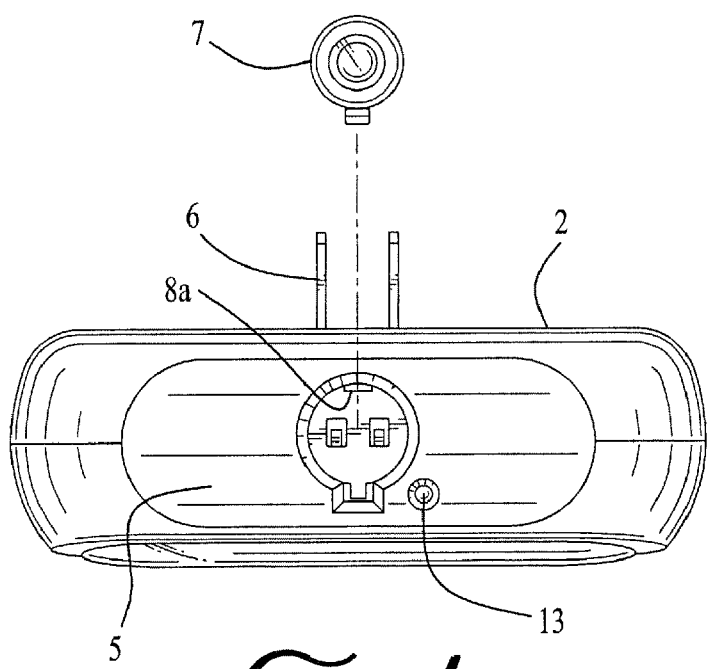

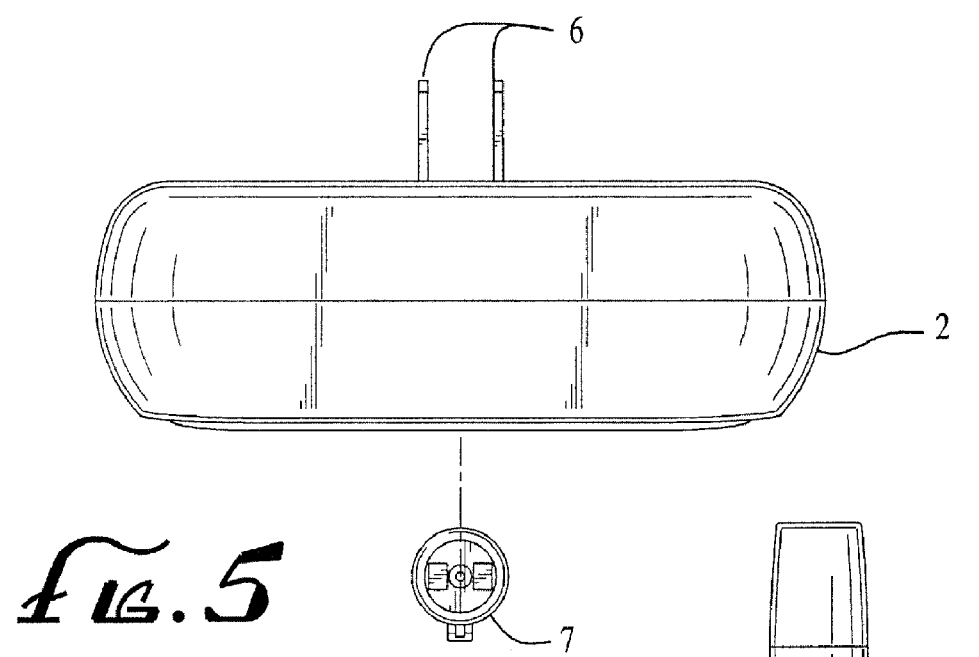
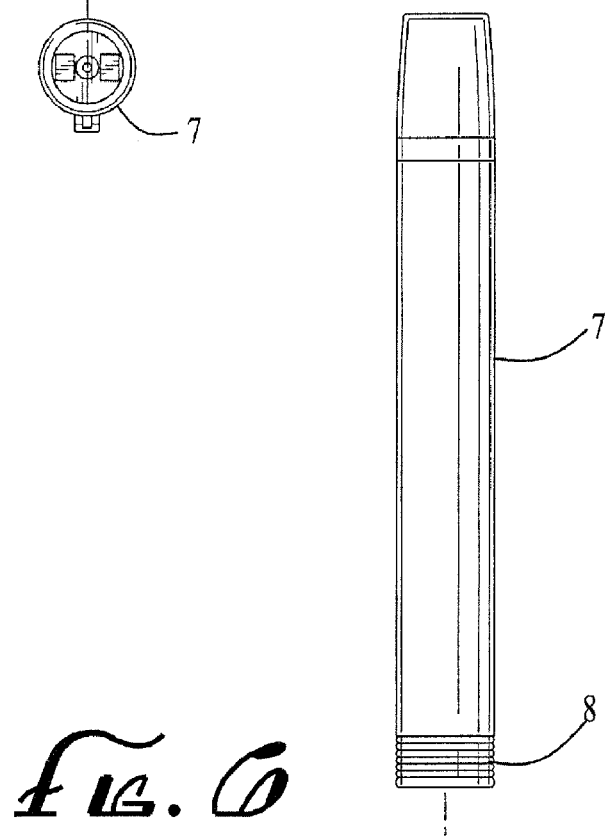
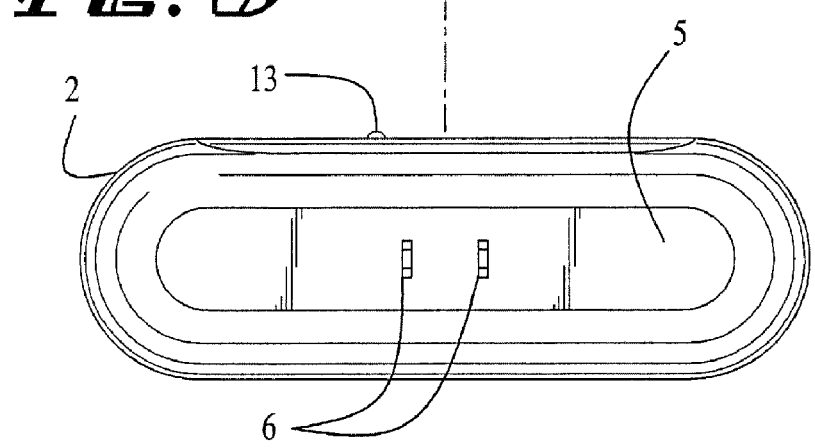

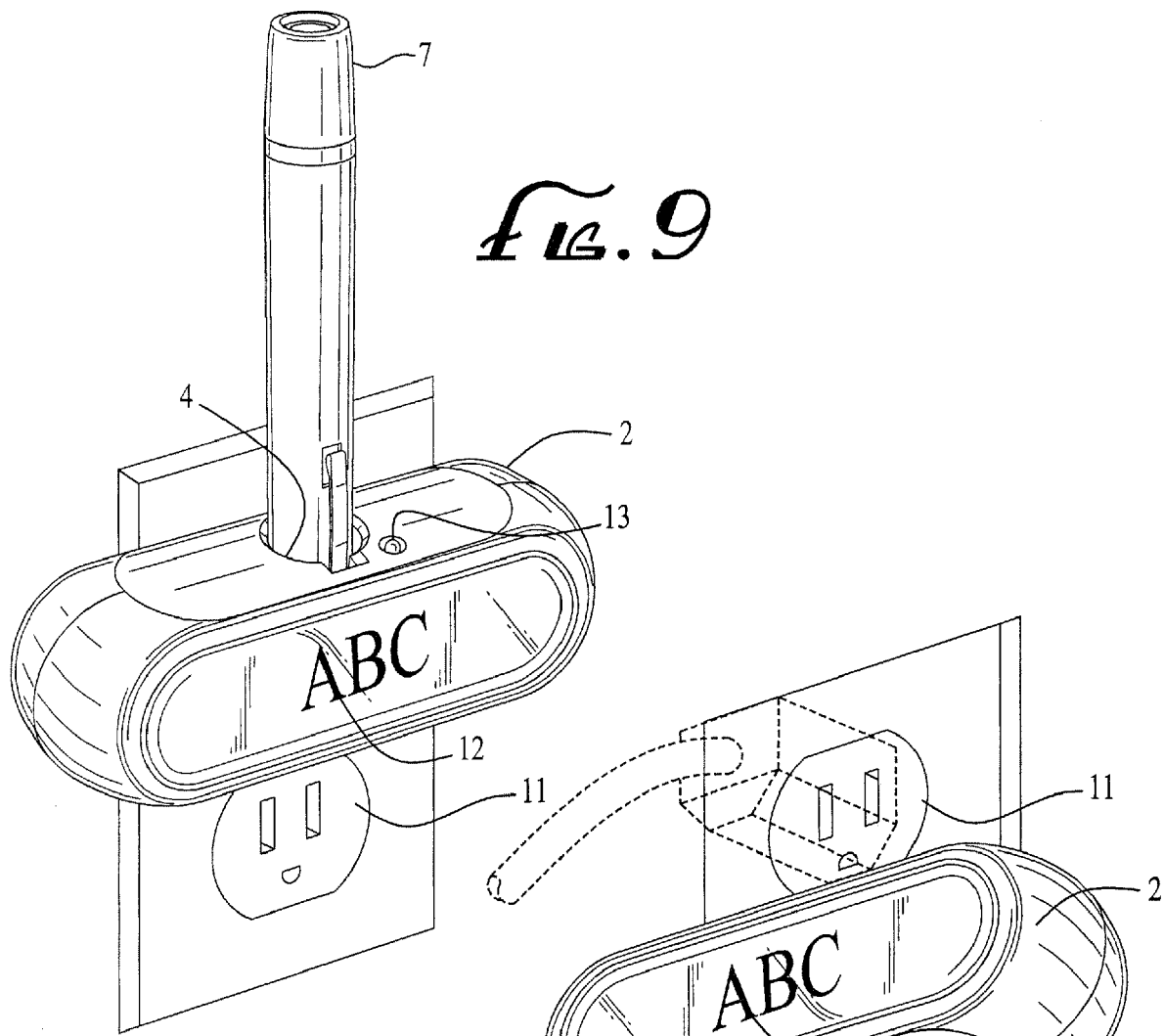

RECHARGING UNIT

CROSS-REFERENCE TO RELATED APPLICATIONS

This application is a continuation of application Ser. No. 11/008,051, filed on Dec. 8, 2004 now U.S. Pat. No. 7,086,907, which is hereby incorporated by reference.

BACKGROUND OF THE INVENTION

A variety of recharging units are well known in the prior art. These units typically utilize either a recharging base with a cord which plugs into the wall outlet, or a large and bulky recharging base unit which plugs directly into an outlet. The devices which include a plug and cord attached to a stationary charging base are inherently disadvantageous, as the cords are susceptible to fraying and failure and the recharging base would then typically be placed on a table, desk or other surface, thereby limiting the logistical locations for its use. For example, in a medical examination or emergency treatment area, there may not be a table nearby and any work top space for storing tools and devices may be scarce.

A second type of recharging units are those which are plugged directly into a wall electrical outlet. These products, however, are typically large, bulky and boxy shaped. When inserted into one socket of a two socket wall electrical outlet, these units are sized and shaped such that both sockets are blocked by the base and/or its recharging implement, regardless of whether inserted in the top or bottom socket of the outlet.

What is lacking in the existing art is a recharging unit which is of a shape and configuration such that when it occupies one of the two electrical sockets, it does not block, but instead permits access to, the second socket. What is also lacking in the recharging units in prior art is the capability of holding securely a rechargeable implement in an inverted position, which is necessary to leave the top socket open when the recharging unit is plugged into the bottom socket. What is further lacking in such prior art is the benefit of exploiting recharging units as an advertising means whereby advertising material can be displayed on an outer surface of a recharging unit.

SUMMARY OF THE INVENTION

The present invention relates to a recharging unit which plugs directly into a standard two socket wall electrical outlet. More specifically, the present invention relates to a recharging unit which is configured such that its insertion directly into one of the two sockets will not block access to the second socket of the outlet. While the present invention is contemplated for use, preferably, with a rechargeable implement such as a flashlight used in a medical examination room, the possibilities for applicable rechargeable implements are limitless. The present invention can be configured to be used for virtually any cordless rechargeable implements, including but not limited to, power tools, drills, screwdrivers, dental tools, medical examination lights and tools and many other handheld implements.

The present invention also relates to advertising means for presenting a business' message by affording one or more surface of the recharging unit for imprinting advertising material thereon.

An advantage of the present invention is to provide a recharging unit for one or more rechargeable implements which is configured such that when installed directly into one socket of a conventional wall dual socket electrical outlet, the user may still gain full access to the other socket as neither the recharging base nor the rechargeable implement(s) will block the user's access. Another advantage of the present invention is to provide a recharging unit that can securably hold an rechargeable implement in an inverted position, which would be needed for realizing first advantage stated above when the recharging unit is plugged into the bottom socket of the electrical outlet.

Still another advantage of this invention is to provide a recharging base into which multiple recharging implements, even of different types, may be concurrently inserted for recharging. The availability of multiple implements improves efficiency and duration of use.

A further advantage of the invention is to provide an advertising means for businesses to display advertising material on an outer surface of a recharging unit.

BRIEF DESCRIPTION OF THE DRAWINGS

FIG. 1 is a top front perspective view of a recharging unit;

FIG. 2 is a front elevation view of the recharging unit of FIG. 1;

FIG. 3 is a side elevation view of the recharging unit of FIG. 1;

FIG. 4 is a top plan view of the recharging unit of FIG. 1;

FIG. 5 is a bottom plan view of the recharging unit of FIG. 1;

FIG. 6 is a back elevation view of the recharging unit of FIG. 1;

FIG. 9 is a top front perspective view of the recharging unit of FIG. 1, shown as it would be inserted into the top socket of a common electrical outlet; and FIG. 10 is a top front perspective view of the recharging unit of FIG. 1, shown as it would be inserted into the bottom socket of a common electrical outlet.

DETAILED DESCRIPTION OF THE PREFERRED EMBODIMENT

Figure 7:
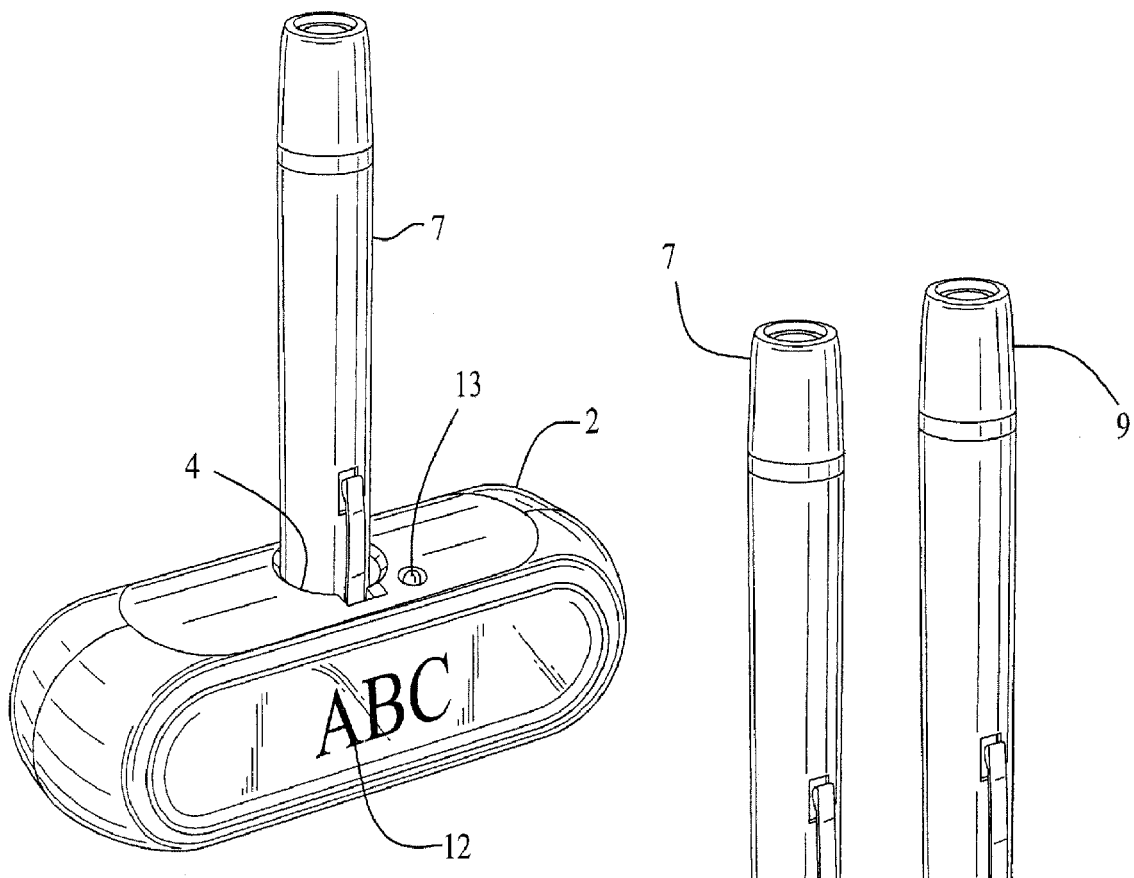
FIG. 7 is another top front perspective view of the recharging unit of FIG. 1.

As shown in FIGS. 1 and 2, a preferred embodiment of the invention is comprised of a recharging base (1) which includes an elongated body section (2), a front face (3) and at least one implement recharging orifice (4), into which a rechargeable hand held implement (7) would be inserted for recharging. Although the recharging base has been depicted as having a horizontal elongated configuration, the configuration contemplated within the present invention is not so limited and may take other shapes as well. Similarly, although the recharging orifice (4) has been depicted, preferably, as a circular hole, it may take other geometrical shapes, without contradicting the spirit of the present invention, to retain rechargeable implements of diverse shapes. The functions and means for establishing electrical interface between the orifice (4) and the rechargeable implement (7) for recharging are well known to those skilled in the art. As shown in FIGS. 3 through 6, the recharging base (1) also includes two male electrical prongs (6) projected from the rear surface (5). These prongs (6) will be inserted into one socket of a common two socket electrical wall outlet to facilitate the recharging cycle. The internal electronics and components of such a recharging unit are well known to those skilled in the art. Further, in the preferred embodiment the recharging base may have a signal light (12) located preferably next to each of the recharging orifice to signal whether the recharging process is under way.

The preferred embodiment of the present invention further includes one or more rechargeable implements (7) which are inserted into the orifice (4) of the base (1) for recharging. FIGS. 1 through 7 and FIG. 9 show the implement (7) in the configuration of a small flashlight, of the size and type commonly used in medical examination rooms. In this preferred embodiment, the handheld implement (7) further includes a thread (8) formed preferably at the bottom end of the implement (7). It would then matches a detent (8-1) formed preferably near the bottom the orifice (4) shown in FIG. 4 when the implement (7) is inserted into the orifice (4) in order to securably retain the implement (7) within the orifice (4) during recharging even in an inverted position as shown in FIG. 10. Hand held implements, such as the exam flashlight light, are well known to those skilled in the art. While the figures depict the rechargeable implement as a flashlight, the possible scope of implements that can be used in this recharging unit may include virtually any cordless rechargeable implement, including, but not limited to handheld implements such as power tools, drills, screwdrivers, dental tools, and medical examination lights and tools, and many other implements.

Figure 8:
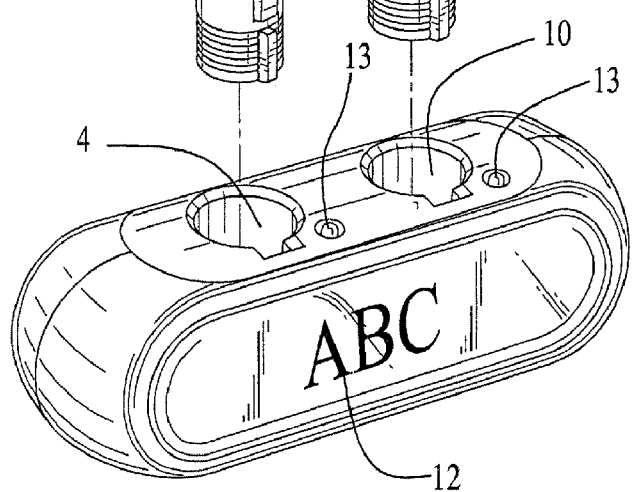
FIG. 8 is a top front perspective view of an alternative embodiment of the recharging unit of FIG. 1.

FIG. 8 shows the rechargeable device in an embodiment which includes two hand held implements (7) and (9), inserted into two orifices (4) and (10) of the base (1). Again, while FIG. 8 depicts each of the implements as a flashlight, the invention contemplates embodiments in which each of the two or more included implements could be either an identical or different type. An example of different implements which may be inserted into the recharging base would be one as a flashlight and the second as a dental tool. Such hand held implements would be well known to those skilled in the art.

FIG. 9 shows a preferred embodiment of the invention as it would be inserted into the top socket of a common two socket electrical wall outlet (11). As shown in FIG. 9, when the base unit (1) is fully inserted into the top socket and implements (7) are inserted into the orifice(s) (4) the bottom socket is free to accept another plug or electrical device.

FIG. 10 shows a preferred embodiment of the invention where the recharging unit is plugged into the bottom socket of the outlet in an inverted orientation. To expose the top socket, the rechargeable implement (7) needs to be held upside down within the orifice (4) during recharging. For secure retainment of the implement (7), the preferred embodiment uses the thread (8) formed on the implement (7) and the matching detent (8-1) formed at the bottom of the orifice (4). Other means for accomplishing the same purpose, such as frictional fitting, are well known in the art and also within the contemplated scope of the present invention.

In yet another preferred embodiment, advertising or graphical material (12) is imprinted on at least one face of the base (1). As depicted in FIGS. 1 and 2, the front surface (3) would be an appropriate location for imprinting such material. Advertising or graphical materials (12) may also be imprinted on the outer surface of the hand held implement (7) and/or (9). Imprinting advertising or graphical material upon one or more of surfaces of the recharging unit is also contemplated by the present invention as an effective method of advertising or promotion.

The preferred embodiment of the present invention further includes one or more rechargeable implements (7) which are inserted into the orifice (4) of the base (1) for recharging. FIGS. 1 through 7 and FIG. 9 show the implement (7) in the configuration of a small flashlight, of the size and type commonly used in medical examination rooms. In this preferred embodiment, the handheld implement (7) further includes a thread (8) formed preferably at he bottom end of the implement (7). It would then matches detent (8*a*) formed preferably near the bottom the orifice (4) shown in FIG. 4 when the implement (7) is inserted into the orifice (4) in order to securably retain the implement (7) within the orifice (4) during recharging even in an inverted position as shown in FIG. 10. Hand held implements, such as the exam flashlight light, are well known to those skilled in the art. While the figures depict the rechargable implement as a flashlight, the possible scope of implements that can be used in this recharging unit may include virtually any cordless rechargeable implement, including, but not limited to handheld implements such as power tools, drills screwdrivers, dental tools, and medical examination lights and tools, and many other implements.

FIG. 10 shows a preferred embodiment of the invention where the recharging unit is plugged into the bottom socket of the outlet in an inverted orientation. To expose the top socket, the rechargeable implement (7) needs to be held upside down within the orifice (4) during recharging. For secure retainment of the implement (7), the preferred embodiment uses the thread (8) formed on the implement (7) and the matchig detent (8*a*) formed at the bottom of the orifice (4). Other means for accomplishing the same purpose, such as frictional fitting, are well known in the art and also within the contemplated scope of the present invention.

What is claimed is:

1. A method of advertising or promotion on a recharging unit comprising the steps of:
    (a) preparing said recharging unit comprising:
        (1) a recharging base,
        (2) at least one orifice defined by at least one outer surface of said recharging base, each of said at least one orifice forming a respective closed periphery on the surface where said orifice is defined, each of said at least one orifice being sized and configured to receive a rechargeable implement for recharging, and further configured such that the rechargeable implement is securably retainable therein in an inverted position during recharging, and
        (3) two male electrical prongs protruding from a rear surface of said recharging base for insertion into a common two-socket electrical outlet; and
    (b) imprinting advertising or graphical material on at least one outer surface of said recharging unit.

2. A recharging unit for charging rechargeable implements, said unit comprising:
    (a) a recharging base having at least one outer surface;
    (b) at least one orifice defined by the at least one outer surface, each of said at least one orifice forming a respective closed periphery on the surface where said orifice is defined, each of said at least one orifice being sized and configured to securably retain therein one of the rechargeable implements during recharging, even in an inverted position;
    (c) two male electrical prongs protruding from a rear surface of said recharging base for insertion into a common two-socket electrical outlet; and
    (d) a status light formed proximate to each of said at least one orifice for indicating charging status.

3. The recharging unit as in claim 2, wherein each of said at least one orifice has a locking member formed proximate a bottom thereof to securably retain one of the rechargeable implements thereby.

4. The recharging unit as in claim 2, wherein the closed periphery of said at least one orifice has a substantially circular shape.

5. The recharging unit as in claim 2, wherein the at least one outer surface defines at least two orifices.

6. The recharging unit as in claim 5, wherein at least one of said at least two orifices is sized and shaped differently from the rest of said at least two orifices.

7. A recharging unit for charging rechargeable implements, said unit comprising:
 (a) a recharging base having at least one outer surface;
 (b) at least one orifice defined by the at least one outer surface, each of said at least one orifice forming a respective closed periphery on the surface where said orifice is defined, each of said at least one orifice being sized and configured to securably retain therein one of the rechargeable implements during recharging, even in an inverted position;
 (c) two male electrical prongs protruding from a rear surface of said recharging base for insertion into a common two-socket electrical outlet;
 (d) a status light formed proximate to each of said at least one orifice for indicating charging status; and
 (e) graphical material imprinted on at least one outer surface of said recharging base for advertising or promotion.

8. The recharging unit as in claim 7, wherein each of said at least one orifice has a locking member formed proximate a bottom thereof to securably retain one of the rechargeable implements thereby.

9. The recharging unit as in claim 7, wherein the closed periphery of said at least one orifice has a substantially cireular shape.

10. The recharging unit as in claim 7, wherein the at least one outer surface defines at least two orifices.

11. The recharging unit as in claim 10, wherein at least one of said at least two orifices is sized and shaped differently from the rest of said at least two orifices.

12. A recharging unit comprising:
 (a) at least one rechargeable implement;
 (b) a recharging base having at least one outer surface;
 (c) at least one orifice defined by the at least one outer surface, each of said at least one orifice forming a respective closed periphery on the surface where said orifice is defined, each of said at least one orifice being sized and configured to securably retain therein one of said at least one rechargeable implement during recharging, even in an inverted position;
 (d) two male electrical prongs protruding from a rear surface of said recharging base for insertion into a common two-soeket electrical outlet;
 (e) a status light formed proximate to each of said at least one orifice for indicating charging status; and
 (f) graphical material imprinted on at least one outer surface of said at least one rechargeable implement for advertising or promotion.

13. The recharging unit as in claim 12, wherein each of said at least one orifice has a locking member formed proximate a bottom thereof to securably retain one of said at least one rechargeable implement thereby.

14. The recharging unit as in claim 12, wherein the closed periphery of said at least one orifice has a substantially circular shape.

15. The recharging unit as in claim 12, wherein the at least one outer surface defines at least two orifices.

16. The recharging unit as in claim 15, wherein at least one of said at least two orifices is sized and shaped differently from the rest of said at least two orifices.

17. A recharging unit for charging rechargeable implements, said unit comprising:
 (a) a recharging base having at least one outer surface;
 (b) at least one orifice defined by the at least one outer surface, each of said at least one orifice forming a respective closed periphery on the surface where said orifice is defined, each of said at least one orifice being sized and configured to securably retain therein one of the rechargeable implements during recharging, even in an inverted position; and
 (c) two male electrical prongs protruding from a rear surface of said recharging base for insertion into a common two-socket electrical outlet, wherein said recharging base is shaped and said male electrical prongs are positioned and oriented on the rear surface of said recharging base such that when said recharging base is fitted, with proper orientation, into either of the two sockets of the electrical outlet, the other socket is unblocked by said recharging unit to permit access by other electrical instruments.

18. The recharging unit as in claim 17, wherein each of said at least one orifice has a locking member formed proximate a bottom thereof to securably retain one of the rechargeable implements thereby.

19. The recharging unit as in claim 17, wherein the closed periphery of said at least one orifice has a substantially circular shape.

20. The recharging unit as in claim 17, wherein the at least one outer surface defines at least two orifices.

21. The recharging unit as in claim 20, wherein at least one of said at least two orifices is sized and shaped differently from the rest of said at least two orifices.

* * * * *